United States Patent
Mochizuki

(10) Patent No.: US 9,560,541 B2
(45) Date of Patent: Jan. 31, 2017

(54) WIRELESS TRANSMISSION DEVICE, VSWR DETERMINATION DEVICE, AND VSWR DETERMINATION METHOD

(71) Applicant: NEC Corporation, Tokyo (JP)

(72) Inventor: Takuji Mochizuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/430,114

(22) PCT Filed: Apr. 26, 2013

(86) PCT No.: PCT/JP2013/002852
§ 371 (c)(1),
(2) Date: Mar. 20, 2015

(87) PCT Pub. No.: WO2014/049907
PCT Pub. Date: Apr. 3, 2014

(65) Prior Publication Data
US 2015/0230116 A1 Aug. 13, 2015

(30) Foreign Application Priority Data
Sep. 25, 2012 (JP) ................................. 2012-211228

(51) Int. Cl.
*H04W 24/10* (2009.01)
*H04L 25/02* (2006.01)
(Continued)

(52) U.S. Cl.
CPC ........... *H04W 24/10* (2013.01); *H04B 17/309* (2015.01); *H04L 25/02* (2013.01); *H04W 88/08* (2013.01)

(58) Field of Classification Search
CPC ...... H04B 17/309; H04L 25/02; H04W 24/10; H04W 88/08
(Continued)

(56) References Cited

U.S. PATENT DOCUMENTS

| 5,408,690 A | * | 4/1995 | Ishikawa | ................ | G01R 27/06 324/646 |
| 2002/0123363 A1 | * | 9/2002 | Hildebrand | ............ | H04B 17/19 455/522 |
| 2015/0333711 A1 | * | 11/2015 | Langer | ................. | H04B 1/0458 455/127.2 |

FOREIGN PATENT DOCUMENTS

| CA | 2052527 A1 | 4/1992 |
| EP | 0479168 A2 | 4/1992 |

(Continued)

OTHER PUBLICATIONS

International Search Report corresponding to PCT/JP2013/002852 mailed Jun. 11, 2013 (2 pages).

(Continued)

*Primary Examiner* — Omer S Mian
*Assistant Examiner* — Nizam Ahmed
(74) *Attorney, Agent, or Firm* — Wilmer Cutler Pickering Hale and Dorr LLP

(57) ABSTRACT

A wireless transmission device (100) of the invention includes a VSWR measuring means (101) which measures VSWR; and a VSWR determining means (102) which determines reliability of a measurement value of the VSWR measured by the VSWR measuring means (101). The VSWR determining means (102) includes a baseband signal analyzing means (90) which analyzes a baseband signal by detecting a difference between the baseband signal, and a delay signal of the baseband signal; a baseband signal density determining means (19) which determines a density of the baseband signal, based on the difference between the baseband signal and the delay signal analyzed by the baseband signal analyzing means (90), and a VSWR output switching means (13) which restrains output of the VSWR measuring means, when the baseband signal density determining means (19) determines that the density of the baseband signal is low.

5 Claims, 9 Drawing Sheets

(51) Int. Cl.
*H04W 88/08* (2009.01)
*H04B 17/309* (2015.01)

(58) Field of Classification Search
USPC .......................................... 370/252
See application file for complete search history.

(56) References Cited

FOREIGN PATENT DOCUMENTS

| | | | |
|---|---|---|---|
| EP | 1209475 A1 | 5/2002 | |
| JP | H03-051772 | 3/1991 | |
| JP | H04-086567 A | 3/1992 | |
| JP | EP 0479168 A2 * | 4/1992 | ............. G01R 27/06 |
| JP | H04-357471 A | 12/1992 | |
| JP | 2697342 B2 | 1/1998 | |
| JP | 3271277 B2 | 4/2002 | |
| JP | 2002-228692 A | 8/2002 | |
| JP | 2004-286632 A | 10/2004 | |
| JP | 2005-017138 A | 1/2005 | |
| JP | 4062023 B2 | 3/2008 | |
| JP | 4379034 B2 | 12/2009 | |
| JP | 2011-010185 A | 1/2011 | |
| SE | EP 1209475 A1 * | 5/2002 | ............. H04B 17/19 |

OTHER PUBLICATIONS

Japanese Office Action issued by the Japan Patent Office for Application No. 2014-538088 dated Jun. 30, 2015 (3 pages).

* cited by examiner

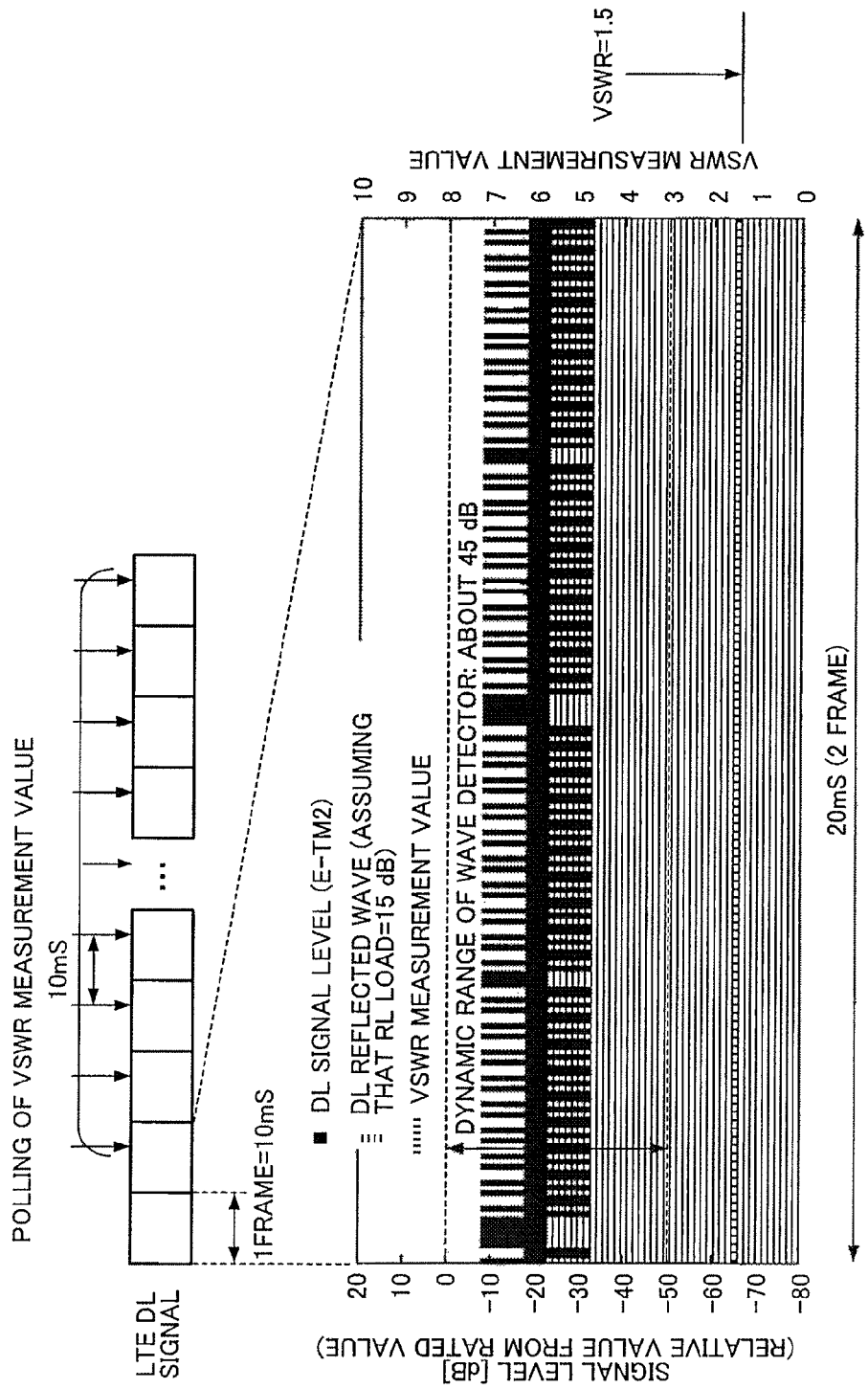

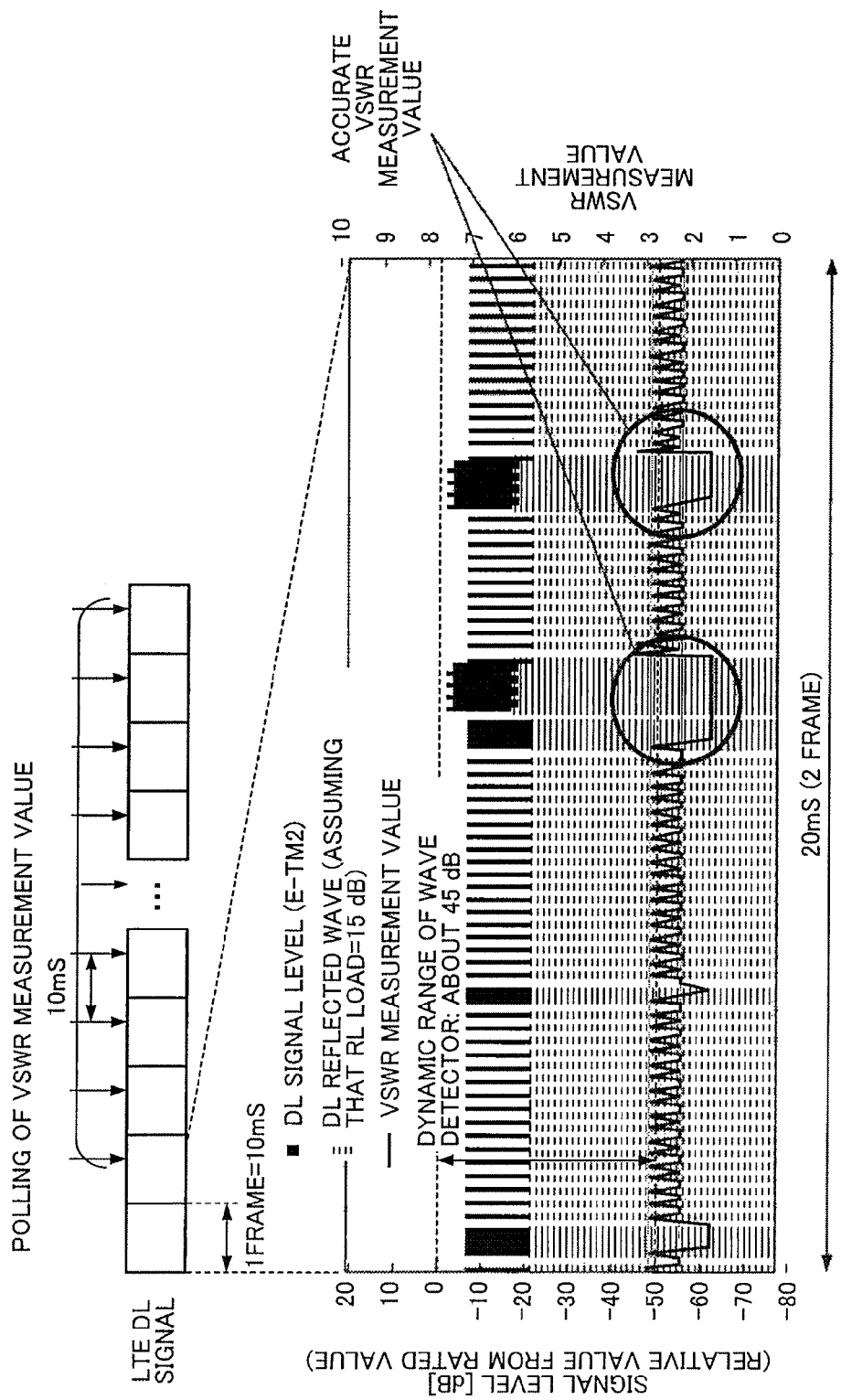

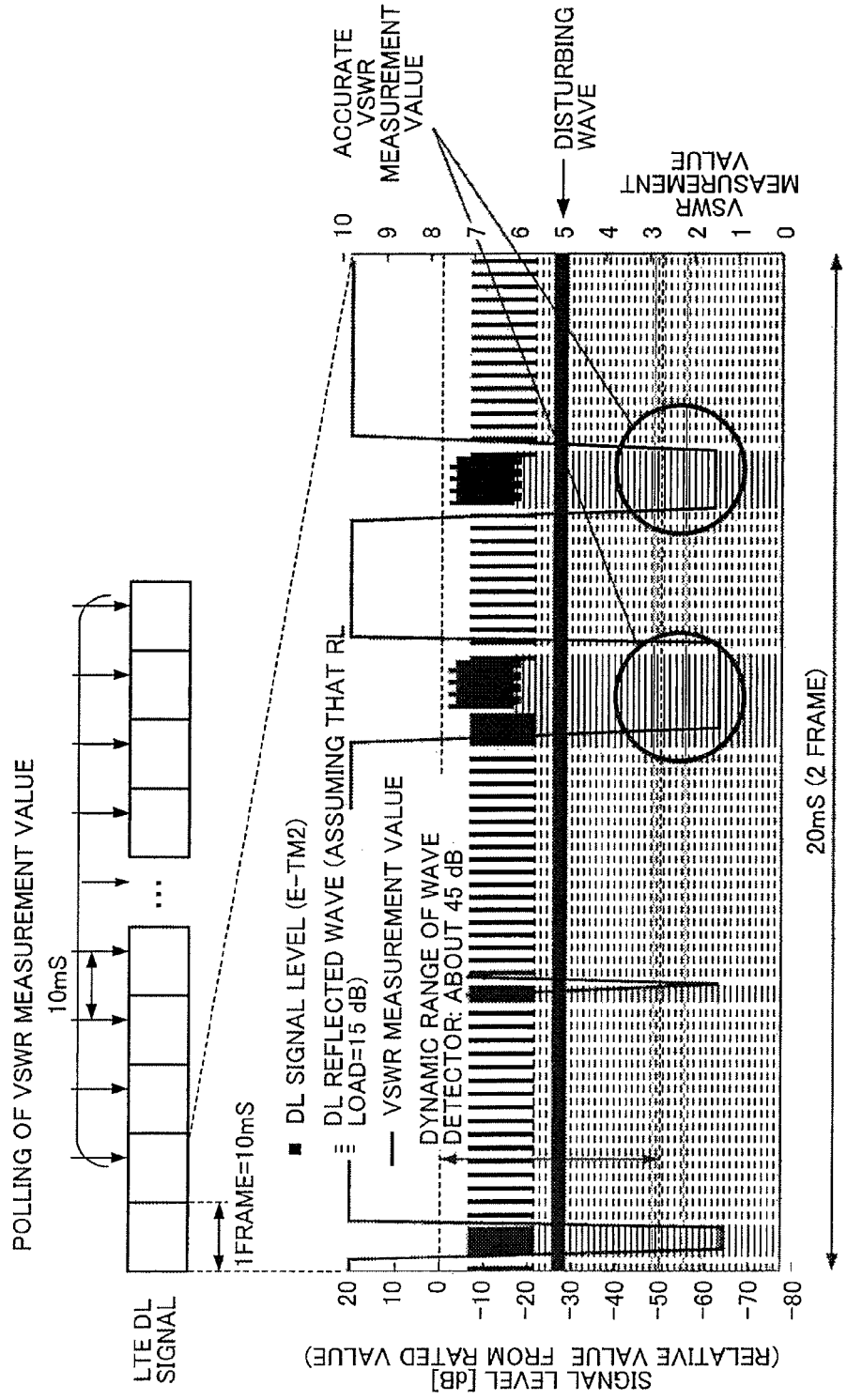

WIRELESS TRANSMISSION DEVICE, VSWR DETERMINATION DEVICE, AND VSWR DETERMINATION METHOD

CROSS-REFERENCE TO RELATED APPLICATIONS

This application is a national stage application of International Application No. PCT/JP2013/002852 entitled "Wireless Transmission Device, VSWR Determination Device, and VSWR Determination Method," filed on Apr. 26, 2013, which claims the benefit of the priority of Japanese Patent Application No. 2012-211228, filed on Sep. 25, 2012, the disclosures of each of which are hereby incorporated by reference in their entirety.

TECHNICAL FIELD

The present invention relates to a wireless transmission device, a VSWR determination device, and a VSWR determination method, and particularly, relates to a technique for processing VSWR.

BACKGROUND ART

In LTE (Long Term Evolution) as a telecommunications standard of the mobile phone, a system is configured to include RRE (Remote Radio Equipment) or the like, which shares an antenna with W-CDMA (Wideband Code Division Multiple Access) in order to improve workability at the time of installation and to reduce the running cost. When a base station wireless transmission device of one system based on an OFDM (Orthogonal Frequency Division Multiplexing) system such as LTE and the like, and a base station wireless transmission device of the other system are coupled to each other with use of a sharing antenna or the like, an interference wave from the wireless transmission system of the other system is input to the wireless transmission device of the one system, and serves as a disturbing wave. It is important to precisely measure VSWR (Voltage Standing Wave Ratio) even in the environment as described above, and to apply the measurement result on the system for controlling wireless communication.

FIG. 2 illustrates a VSWR measurement device and a VSWR measurement method in a first related art. A baseband signal generator 2 converts an input data signal generated in MAC 1 into an I/Q axis signal as a modulated baseband signal. Then, a modulator 3 modulates the I/Q axis signal into an RF-band modulated downlink signal, based on an oscillation signal from a local oscillator 40. A high output amplifier 4 amplifies the RF-band modulated downlink signal to a predetermined transmission power for output to a filter 5. The filter 5 reduces a transmitted spurious component of the RF-band modulated downlink signal. The RF-band modulated downlink signal is emitted to the space by an antenna 7. A VSWR measurement device precedes the antenna 7 in order to measure VSWR when the antenna 7 is installed, and to check that spatial emission from the antenna 7 is carried out without a problem. In this example, a directional coupler 6 is inserted to precede the antenna 7 in order to detect a traveling wave and a reflected wave for VSWR measurement.

The directional coupler 6 outputs a traveling wave to a traveling wave detector 8. Further, the directional coupler 6 outputs a reflected wave to a reflected wave detector 9. The traveling wave detector 8 detects a voltage value of a traveling wave. Further, the reflected wave detector 8 detects a voltage value of a reflected wave. A difference detector 10 detects a difference between the detected voltage value of the traveling wave and the detected voltage value of the reflected wave. A VSWR calculator 11 calculates VSWR, based on the difference between the detected voltage values, and a VSWR average unit 12 performs a smoothing process to the calculated VSWR. In the first related art, VSWR smoothed by the VSWR average unit 12 is output and displayed as a final report value. In the environment to be described later, however, a large error may be included in a measurement result of VSWR.

Next, a matter to be environmentally concerned is described. FIG. 5 illustrates a case, in which a base station wireless transmission device of one system based on an OFDM system such as LTE and the like, and a base station wireless transmission device of the other system are coupled to each other with use of a sharing antenna or the like. In this case, an interference wave from the wireless transmission device of the other system is input to the wireless transmission device of the one system.

FIG. 6 illustrates a time waveform of a downlink signal in LTE. Signals are densely present on the time axis in a test model such as E-TM1.1 or E-TM2. On the other hand, in a control channel signal whose density is the lowest among the actual operation signals (a state that no terminal link is present), broadcast information of a short duration, and a reference signal of a shorter duration, serving as a training signal on the terminal side, are sparsely present on the time axis within one frame (=10 subframes·10 msec).

In view of the above, a problem to be solved when VSWR measurement is performed in various environments by a configuration example of the VSWR measurement device illustrated in FIG. 2 is described. As illustrated in FIG. 7, when a test signal having a high density is used, the signal level fluctuates, but the measurement value of VSWR is always accurate (in this case, 1.5), because the fluctuation is within the dynamic range of a wave detector.

As illustrated in FIG. 8, when a downlink signal having a low density is used, the signal frequently repeats switching between an on-state and an off-state, and a large part of the signal may be lowered than the lower limit of the dynamic range of a wave detector. This may lower the precision of a measurement value of VSWR. On the other hand, during a time period when broadcast information is output, the signal density is high. Therefore, it is possible to obtain an accurate measurement value of VSWR.

Further, as illustrated in FIG. 9, when a backward disturbing wave from the other system is added to a downlink signal whose density is low during an operation, an error may be largely increased, because the disturbing wave may be misjudged as a reflected wave. Precision of a measurement value of VSWR may be considerably lowered depending on the level of the disturbing wave. However, during a time period when broadcast information is output, the measurement value of VSWR is accurate because the signal density is high.

As described above, in an actual environment, when a backward disturbing wave from the other system coupled with use of a sharing antenna is present in a state that the signal density is low, precision of a measurement value of VSWR may be considerably lowered. Further, a measurement result of VSWR when an antenna is installed may be misjudged to be total reflection. As a result, a monitor station may erroneously issue an alarm, and the one system may stop transmitting the wave.

The following are exemplified literatures disclosing the configuration of the VSWR measurement device in the field of first related art. These literatures, however, do not describe a circuitry configuration or consideration relating to a measurement error of VSWR, which may be generated by a backward interference wave/disturbing wave from the outside.

VSWR detection circuit and VSWR detection method (PTL 1, FIG. 1)
VSWR measurement circuit (PTL 2, FIG. 1)
VSWR monitor circuit (PTL 3, FIG. 1)
Antenna port monitor system and method thereof (PTL 4, FIG. 1)

As an improvement of the first related art, the following literatures are exemplified which pay attention to a circuitry configuration or consideration relating to a measurement error of VSWR, which may be generated by a backward interference wave/disturbing wave from the outside.

Antenna monitor device (PTL 5, FIG. 1, FIG. 2)
Standing wave ratio measurement device (PTL 6)
Voltage standing wave ratio measurement device (PTL 7)

The improvement associated with the aforementioned three literatures is disclosed in FIG. 1 of PTL 5. In this example, a directional coupler inserted in order to detect a traveling wave and a reflected wave for VSWR measurement is provided between a filter (band-pass filter) connected to an antenna, and a wireless transmission device. According to this configuration, out-of-band attenuation by the filter is expected. Further, disposing a band-pass filter between a traveling wave detector and a reflected wave detector which are branched from the directional coupler makes it possible to sufficiently suppress an out-of-band interference wave/disturbing wave before wave detection.

Another configuration example associated with the aforementioned three literatures is disclosed in FIG. 2 of PTL 5. In this example, a down converter is disposed on each of a traveling wave path and a reflected wave path which are branched from a directional coupler, and the frequencies of local oscillators of the down converters are differentiated from each other. According to this configuration, allowing a signal of the baseband frequency or of the IF frequency after conversion to pass through a narrower band filter having sharper characteristics, while changing the passing bandwidth for down conversion makes it possible to attenuate the out-of-band interference wave/disturbing wave steeper from the outside. Thus, an error in the measurement value of VSWR due to the interference wave/disturbing wave is reduced.

The advantages of the configurations described in the aforementioned three prior art literatures, however, are obtained when the frequency bandwidth of an interference wave/disturbing wave from the outside is away from an intended transmission bandwidth. On the other hand, when the transmission bandwidth of the local system and the interference bandwidth of another system are close to each other, or when the transmission bandwidth of the local system overlaps the interference bandwidth of another system, it may be difficult to achieve an intended frequency selectivity by the filter. Or, it is necessary to provide a filter having sharper characteristics in order to obtain the advantages. As a result, the degree of difficulty in designing may be considerably increased. This may limits a shape of the device, and may increase the cost. Further, when a filter of a fixed bandwidth is disposed in a wave detection system, it may be difficult to flexibly handle a frequency change.

Next, FIG. 3 and FIG. 4 illustrate a configuration example invented in association with the present application, although this example is not prior art with respect to the invention of the present application. As illustrated in FIG. 3, a baseband signal generator 2 converts an input data signal generated in MAC 1 into an I/Q axis signal as a modulated baseband signal. Then, a modulator 3 modulates the I/Q axis signal into an RF band modulated downlink signal, based on an oscillation signal from a local oscillator 40. A high output amplifier 4 amplifies the RF-band modulated downlink signal to a predetermined transmission power for output to a filter 5. The filter 5 reduces a transmitted spurious component of the RF-band modulated downlink signal. The RF-band modulated downlink signal is emitted to the space by an antenna 7. A VSWR measurement device precedes the antenna 7 in order to measure VSWR when the antenna 7 is installed, and to check that spatial emission from the antenna 7 is carried out without a problem. In this example, a directional coupler 6 inserted to precede the antenna 7 in order to detect a traveling wave and a reflected wave for VSWR measurement.

The directional coupler 6 outputs a traveling wave to a traveling wave detector 8. Further, the directional coupler 6 outputs a reflected wave to a reflected wave detector 9. The traveling wave detector 8 detects a voltage value of a traveling wave. Further, the reflected wave detector 8 detects a voltage value of a reflected wave. A difference detector 10 detects a difference between the detected voltage value of the traveling wave and the detected voltage value of the reflected wave. A VSWR calculator 11 calculates VSWR, based on the difference between the detected voltage values, and a VSWR average unit 12 performs a smoothing process to the calculated VSWR.

In the above example, it is necessary to determine whether the report value from the VSWR average unit 12 is probable. In this configuration example, by branching a baseband signal generated in the baseband signal generator 2 and inputting the branched signals to a baseband signal amplitude integrator 14, signal levels, so as to determine whether the signal density is high enough to measure VSWR with high precision, are accumulated. FIG. 4 illustrates a sequence of masking a report value of VSWR when the baseband level by a determination method based on a threshold value is low. In this sequence, 100 samples of measurement values of VSWR are acquired every 10 msec corresponding to one frame of a downlink signal in LTE, and the VSWR average unit 12 updates the average value of VSWR one time in a second. The baseband signal integrator 14 integrates the baseband levels for one second corresponding to 100 samples each requiring 10 msec without synchronization with the updating operation as described above. When it is determined that a time segment during which the accumulated value as an integration result is equal to or larger than a threshold value set by an amplitude integrated value determiner 15 is continued, the amplitude integrated value determiner 15 determines that the report value of latest VSWR (an output from the VSWR average unit 12) smoothed at the time of the determination is probable. In this case, a switch SW 13 is switched to the direction of outputting and displaying a measurement value of VSWR so as to report the measurement value of VSWR to the outside.

When it is determined that there is a time segment during which the accumulated value as an integration result by the baseband signal integrator 14 is equal to or smaller than the threshold value set by the amplitude integrated value determiner 15, the amplitude integrated value determiner 15 determines that the report value representing a measurement result of latest VSWR (an output from the VSWR average unit 12) to which a smoothing process is applied by the time when the determination is made is not probable. Then, the SW 13 is switched to the direction of displaying that a measurement result of VSWR is invalid so as to invalidate the report on the measurement result of VSWR to the outside.

In the above configuration example, however, it takes time from measuring the baseband level to determination. This may make it difficult to obtain a quick response. Further, when the transmission level is low, regardless that the density of a downlink signal is high, an integrated value does not exceed a threshold value and masking of the measurement result of VSWR may occur, regardless that VSWR can be measured with high precision, as well as a signal having a large instantaneous transmission power and low signal density.

PTL 8 discloses a method for checking not normality on a measurement result of VSWR when a transmission antenna is installed, but normality on a measurement value of VSWR when a receiving antenna is installed. Further, it is necessary to provide a PN (Pseudorandom Noise) spread signal generator and a demodulator individually and dedicatedly in a main signal receiving system in order to measure VSWR of a receiving antenna. This may limits a shape of the device, and may increase the cost. Further, a PN spread signal, which is different from an operation transmission signal, may be emitted from the receiving antenna as unwanted radiation when VSWR is measured. On the other hand, when a backward interference wave from the outside is present when a sharing antenna is used, in the course of deriving a value of VSWR as represented by VSWR=S1/(N+I')−S2/(N+I), I or I' in the denominator may be applied, so that increasing an error in VSWR is also may be a problem. Further, the denominator increases due to the large I or I'. This may make it difficult to secure a sufficient C/N (Carrier to Noise) ratio, and make it impossible to demodulate the PN.

In the technique described in PTL 9, in measurement of VSWR when an antenna (ANT) is connected, when the electrical length between the load of the antenna (ANT) and a coupling port (CPL) is different, and when a traveling wave component leaks to a reflected wave port due to poor directivity of CPL, an error may be included in a composite vector of a reflected wave, and an error may occur in a measurement result of VSWR. Further, disposing a phase unit between the antenna and the coupling port to change the electrical length makes it possible to remove a traveling wave leakage component from the measurement result of VSWR, based on computation of a vector of a maximum reflected wave and a vector of a minimum reflection for improvement of measurement precision of VSWR. Therefore, the example illustrated in PTL 9 provides improvement of measurement precision of VSWR in a state that an external interference wave is not present, and does not consider the density of a traveling wave or of an external interference wave.

CITATION LIST

Patent Literature

PTL 1: Japanese Patent Publication No. 4,379,034
PTL 2: Japanese Laid-open Patent Publication No. H03-051772
PTL 3: Japanese Laid-open Patent Publication No. 2004-286632
PTL 4: Japanese Patent Publication No. 4,062,023
PTL 5: Japanese Laid-open Patent Publication No. H04-357471
PTL 6: Japanese Patent Publication No. 3,271,277
PTL 7: Japanese Patent Publication No. 2,697,342
PTL 8: Japanese Laid-open Patent Publication No. 2011-010185
PTL 9: Japanese Laid-open Patent Publication No. 2005-017138

SUMMARY OF INVENTION

Technical Problem

As described above, in each of the related arts, precision of a measurement value of VSWR may be lowered due to a difference in density of a transmission signal. The present invention is made in view of the above, and an object of the invention is to provide a wireless transmission device, a VSWR determination device, and a VSWR determination method capable of reporting a measurement value of VSWR with improved precision.

Solution to Problem

A wireless transmission device according to an aspect is provided with a VSWR measuring means which measure VSWR; and a VSWR determining means which determine reliability of a measurement value of the VSWR measured by the VSWR measuring means. The VSWR determining means include a baseband signal analyzing means which analyze a baseband signal by detecting a difference between the baseband signal, and a delay signal of the baseband signal; a baseband signal density determining means which determine a density of the baseband signal, based on the difference between the baseband signal and the delay signal analyzed by the baseband signal analyzing means, and a VSWR output switching means which restrain output of the VSWR measuring means, when the baseband signal density determining means determine that the density of the baseband signal is low.

Further, a VSWR determination device according to another aspect is a VSWR determination device for determining reliability of a measurement value of VSWR. The VSWR determination device is provided with a baseband signal analyzing means which analyze a baseband signal by detecting a difference between the baseband signal, and a delay signal of the baseband signal; a baseband signal density determining means which determine a density of the baseband signal, based on the difference between the baseband signal and the delay signal analyzed by the baseband signal analyzing means, and a VSWR output switching means which restrain output of the VSWR measuring means, when the baseband signal density determining means determine that the density of the baseband signal is low.

Furthermore, a VSWR determination method according to yet another aspect is provided with a step of detecting a difference between a baseband signal, and a delay signal of the baseband signal: a step of determining a density of the baseband signal, based on the detected difference; and a step of restraining output of a VSWR measurement result, when it is determined that the density of the baseband signal is low.

Advantageous Effects of Invention

According to the invention, it is possible to provide a wireless transmission device, a VSWR determination device, and a VSWR determination method capable of reporting a measurement value of VSWR with improved precision.

BRIEF DESCRIPTION OF DRAWINGS

FIG. 7 is a diagram illustrating a case, in which VSWR is measured with use of a test signal having a high density.

FIG. 8 is a diagram illustrating a case, in which VSWR is measured with use of a downlink signal having a low density during an operation.

FIG. 9 is a diagram illustrating a case, in which a backward disturbing wave from another system is added to a downlink signal having a low density during an operation.

DESCRIPTION OF EMBODIMENTS

First Exemplary Embodiment

Figure 1:
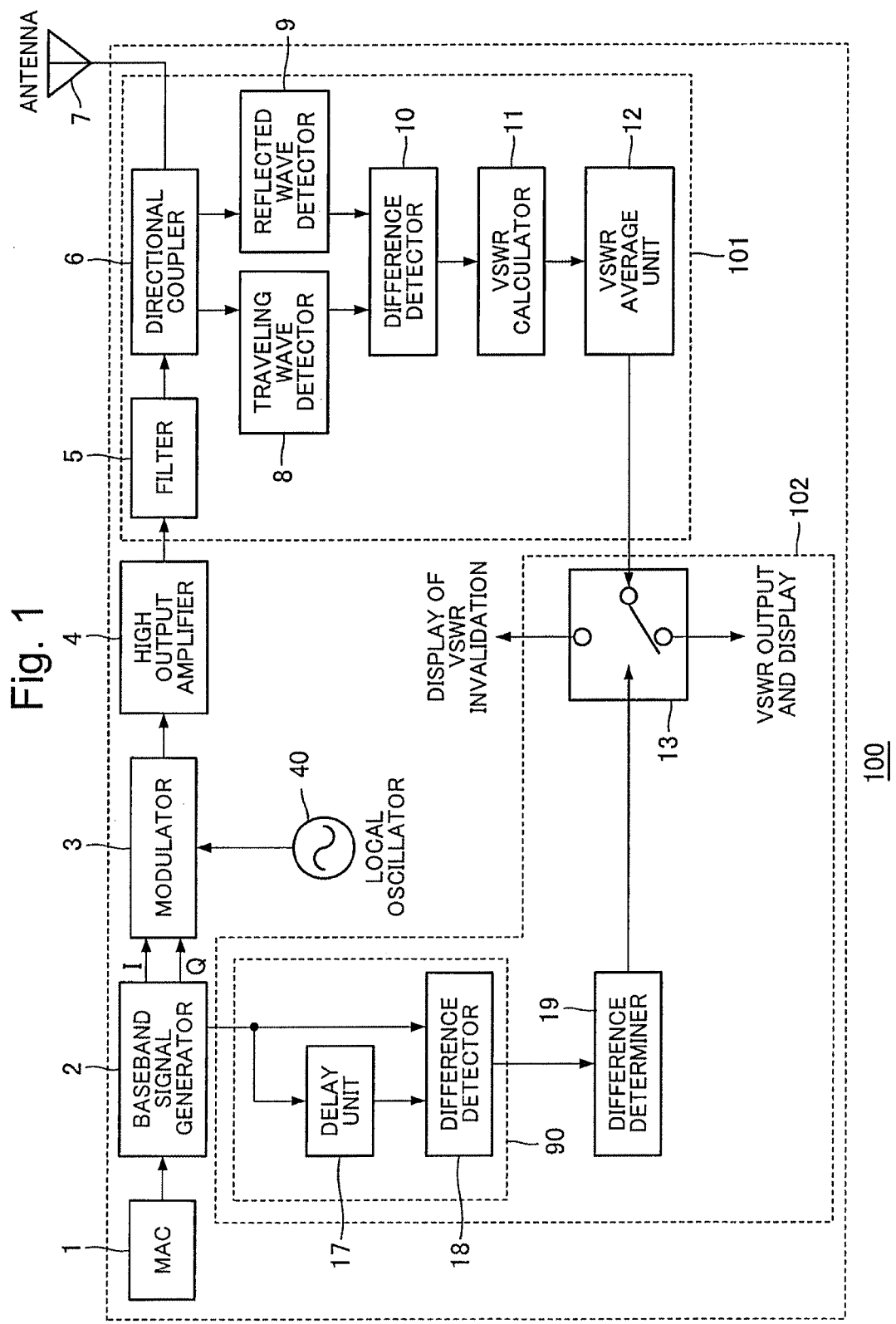
FIG. 1 is a diagram illustrating a wireless transmission device and a VSWR measurement device according to a first exemplary embodiment.
Figure 2:
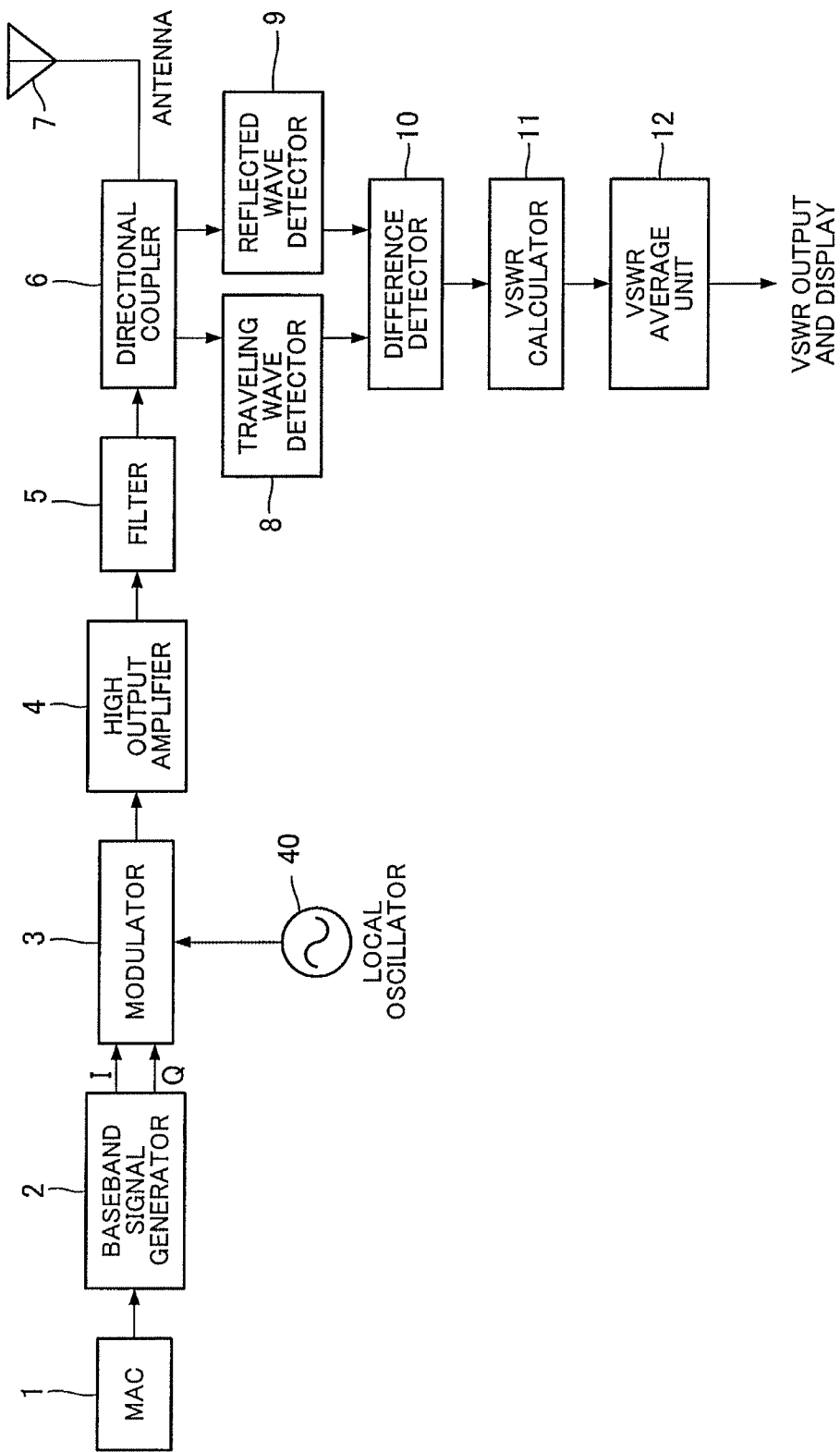
FIG. 2 is a diagram illustrating a wireless transmission device and a VSWR measurement device according to a related method.
Figure 3:
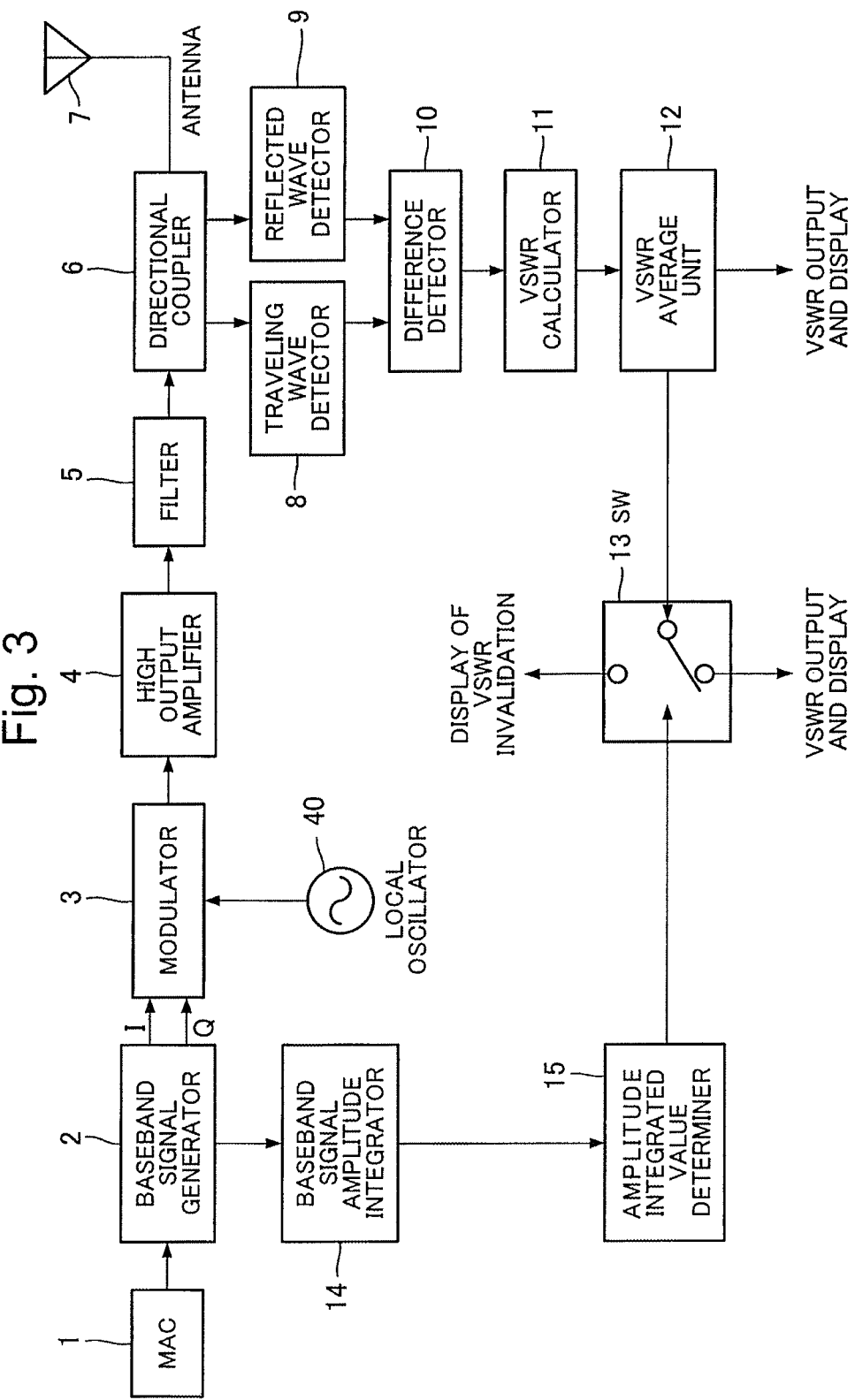
FIG. 3 is a diagram illustrating a wireless transmission device and a VSWR measurement device according to a related method.
Figure 4:
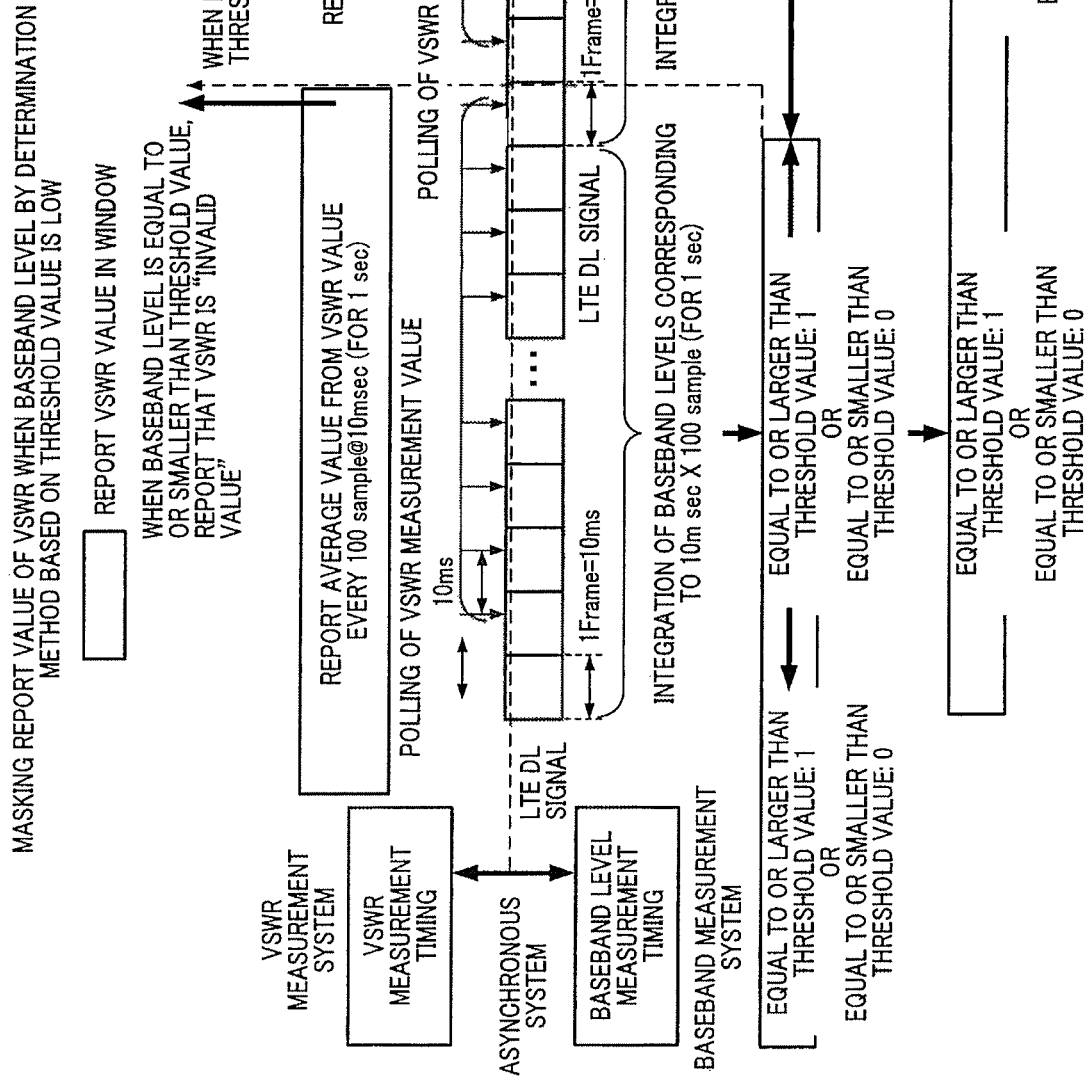
FIG. 4 is a diagram illustrating masking a report value of VSWR when the baseband level is low in determining the baseband level based on a threshold value.
Figure 5:
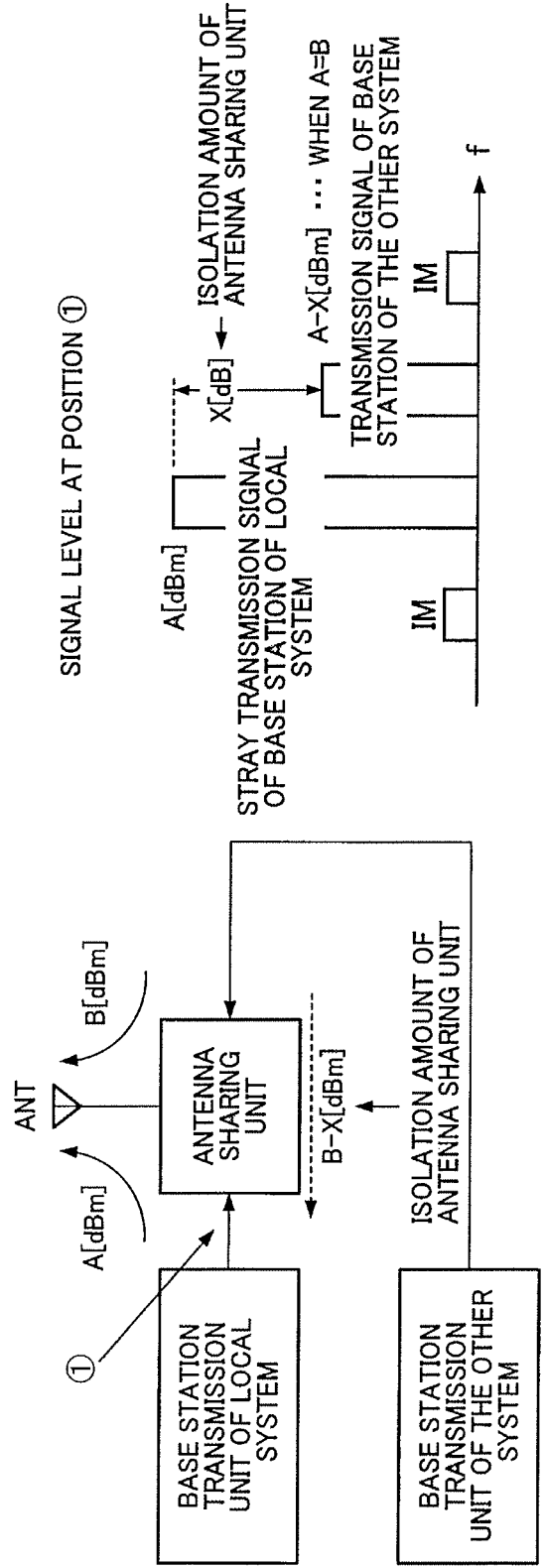
FIG. 5 is a diagram illustrating a case, in which a base station wireless transmission device of the local system, and a base station wireless transmission device of another system are coupled to each other.
Figure 6:
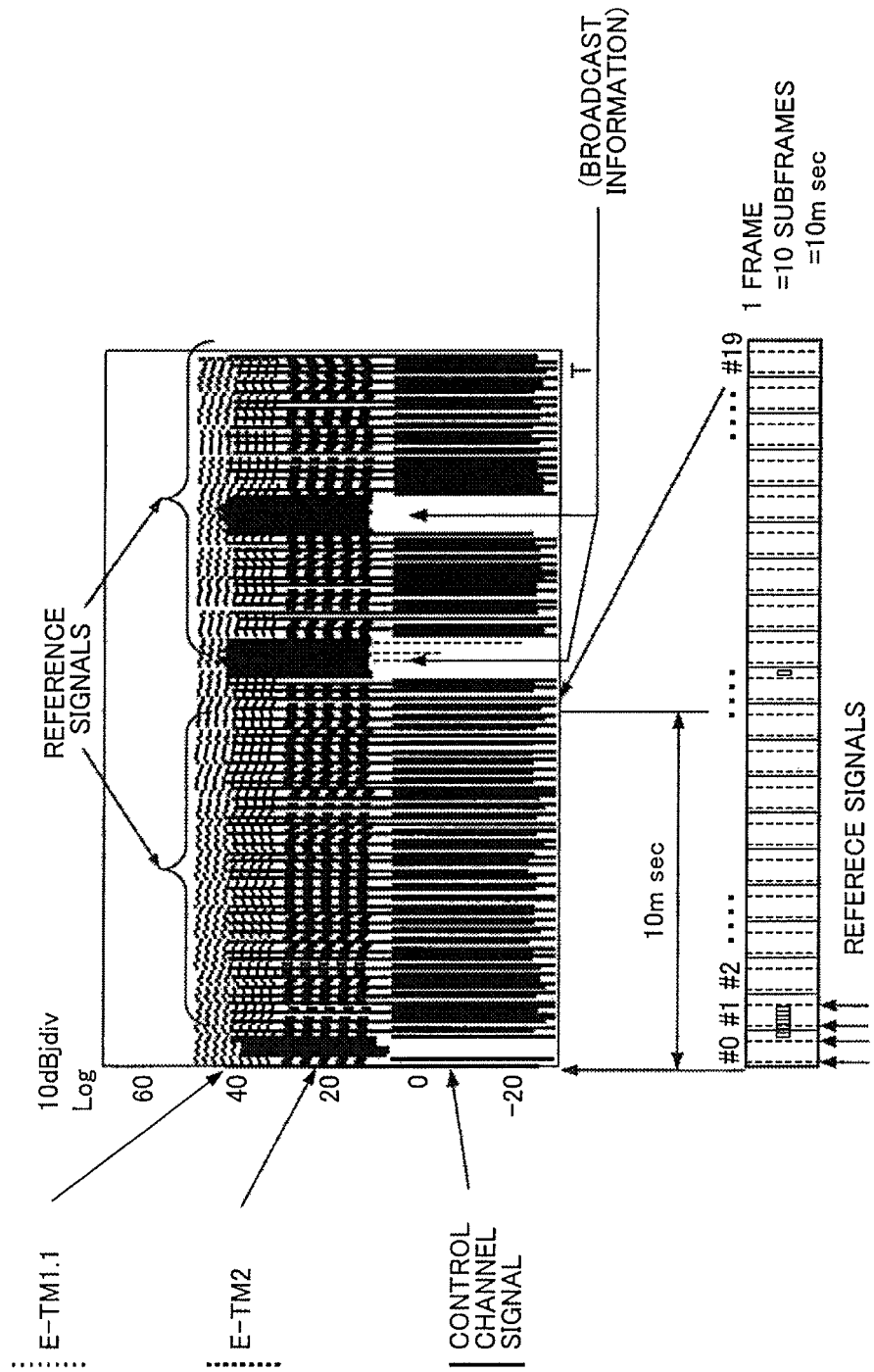
FIG. 6 is a diagram illustrating a time waveform of a downlink signal in LTE.

In the following, a wireless transmission device and a VSWR measurement device of the present application are described by way of an exemplary embodiment of the invention referring to the drawings.

FIG. 1 illustrates a configuration of a wireless transmission device according to the first exemplary embodiment. A wireless transmission device 100 is provided with a VSWR measurement unit 101 and a VSWR determination unit 102. MAC 1 generates a data signal, and outputs the generated data signal to a baseband signal generator 2. The baseband signal generator 2 converts the data signal into an I/Q axis signal as a modulated baseband signal, and outputs the I/Q axis signal to a modulator 3. The modulator 3 modulates the I/Q axis signal into an RF-band modulated downlink signal, based on an oscillation signal from a local oscillator 40. Further, a high output amplifier 4 amplifies the RF-band modulated downlink signal to a predetermined transmission power for output to a filter 5. The filter 5 performs a process for reducing a transmitted spurious component of the RF-band modulated downlink signal. Thereafter, the RF-band modulated downlink signal that has passed through the filter 5 is emitted to the space from an antenna 7. A directional coupler 6 is inserted to precede the antenna 7. A traveling wave and a reflected wave are detected through the directional coupler 6 for VSWR measurement. The VSWR measurement unit 101 measures VSWR when the antenna 7 is installed, and checks that spatial emission from the antenna 7 is carried out without a problem.

A traveling wave detector 8 detects a voltage of a traveling wave input via the directional coupler 6. Further, a reflected wave detector 9 detects a voltage of a reflected wave input via the directional coupler 6. A difference detector 10 detects a difference between the detected voltage of the traveling wave and the detected voltage of the reflected wave. A VSWR calculator 11 calculates a value of VSWR, based on the difference between the detected voltages detected by the difference detector 10. The value of VSWR output from the VSWR calculator 11 is input to a VSWR average unit 12. The VSWR average unit 12 performs a smoothing process to the value of VSWR.

In the present exemplary embodiment, by providing a baseband signal analysis unit 90, whether a report value by the VSWR average unit 12 is determined. The baseband signal analysis unit 90 is provided with a delay unit 17, and a difference detector 18. A baseband signal generated in the baseband signal generator 2 is branched. One of the branched signals is directly input to the difference detector 18, and the other of the branched signals is input to the difference detector 18 after being delayed by the delay unit 17. The difference detector 18 outputs a difference between the directly input baseband signal, and the delayed input baseband signal to a difference determiner 19. The difference determiner 19 determines the density of the baseband signal, based on the difference output from the difference detector 18. Specifically, when the difference is smaller than a predetermined determination threshold value, the difference determiner 19 determines that the density of the baseband signal is high. Further, when the difference is equal to or larger than the predetermined determination threshold value, the difference determiner 19 determines that the density of the baseband signal is low.

That is to say, when the difference is smaller than the determination threshold value, the difference determiner 19 can estimate that a baseband signal having a high density is output. It is possible to determine that the value of VSWR measured in a state that a baseband signal having a high density is output has relatively high measurement precision. Therefore, it is determined that the report value of latest VSWR (an output from the VSWR average unit 12) smoothed at the time when the determination is made is probable. In this case, a switch (SW) 13 is switched to the direction of displaying output of VSWR so as to report the measurement value of VSWR to the outside. On the other hand, when the difference is equal to or larger than the determination threshold value, the difference determiner 19 can estimate that a baseband signal having a low density is output. It is possible to determine that the value of VSWR measured in a state that a baseband signal having a low density is output has relatively low measurement precision. Therefore, it is determined that the report value of the latest VSWR (an output from the VSWR average unit 12) smoothed at the time when the determination is made is not probable. In this case, the switch (SW) is switched to the direction of displaying that a measurement result of VSWR is invalid so as to invalidate the report on the measurement result of VSWR to the outside.

As described above, in the wireless transmission device according to the exemplary embodiment of the invention, even if there is a disturbing wave from a base station wireless transmitter of the other system coupled with use of a sharing antenna, it is possible to automatically and promptly know a timing at which it is possible to precisely report VSWR when an antenna is installed on the outside, and to report the acquired value of VSWR to the outside. The value of VSWR may be reported only in a state that the signal density is high enough to measure VSWR with sufficiently high precision. Therefore, a VSWR alarm or the like due to an erroneous operation is not issued, and an alarm can be issued only when the antenna itself or connection thereof has a problem, and the value of VSWR is degraded.

Here, the invention is not limited by the aforementioned exemplary embodiment, and may be modified as necessary, as far as such modifications do not depart from the gist of the invention. In the aforementioned exemplary embodiment, LTE is used. Alternatively, for instance, the invention may be applied to a communication system relating to telecommunications standards of the fourth generation or higher (such as LTE-advanced, IMT-Advanced, or WiMAX2). Further, when it is determined that the density of a baseband signal is low, output and display of the value of VSWR are not completely stopped, but output of the value of VSWR may be restrained by various means such as displaying an indication that measurement precision is lowered, while continuing to output and display.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2012-211228, filed on Sep. 25, 2012, the disclosure of which is incorporated herein in its entirety by reference.

REFERENCE SIGNS LIST

1 MAC
2 Baseband generator
3 Modulator
4 High output amplifier
5 Filter
6 Directional coupler
7 Antenna
8 Traveling wave detector
9 Reflected wave detector
10 Difference detector
11 VSWR calculator
12 VSWR average unit
13 Switch
14 Baseband signal amplitude integrator
15 Amplitude integrated value determiner
17 Delay unit
18 Difference detector
19 Difference determiner
40 Local oscillator
90 Baseband signal analysis unit
100 Wireless transmission device
101 VSWR measurement unit
102 VSWR determination unit

The invention claimed is:

1. A wireless transmission device, comprising: a Voltage Standing Wave Ratio (VSWR) measuring unit which measures VSWR; and
a VSWR determining unit which determines reliability of a measurement value of the VSWR measured by the VSWR measuring unit, wherein
the VSWR determining unit includes:
a baseband signal analyzing unit which analyzes a baseband signal by detecting a difference between the baseband signal, and a delay signal of the baseband signal, the delay signal of the baseband signal being a time-delayed version of the baseband signal;
a baseband signal density determining unit which determines a density of the baseband signal, based on the difference between the baseband signal and the delay signal analyzed by the baseband signal analyzing unit, and
a VSWR output switching unit which restrains output of the VSWR measuring unit from being displayed, when the baseband signal density determining unit determines that the density of the baseband signal is lower than a determination threshold value, wherein
the VSWR output switching unit outputs a measurement value of the VSWR measured by the VSWR measuring unit and displays the measurement value, when it is determined that the density of the baseband signal is higher than the determination threshold value.

2. The wireless transmission device according to claim 1, wherein the wireless transmission device shares an antenna with a base station wireless transmission device of another system.

3. The wireless transmission device according to claim 1, wherein the wireless transmission device comprises a base station wireless transmission device of LTE OFDM system, and the base station wireless transmission device of LTE OFDM system and a base station wireless transmission device of another system are coupled to each other via a shared antenna.

4. A Voltage Standing Wave Ratio (VSWR), determination device for determining reliability of a measurement value of VSWR, comprising:
a baseband signal analyzing unit which analyzes a baseband signal by detecting a difference between the baseband signal, and a delay signal of the baseband signal, the delay signal of the baseband signal being a time-delayed version of the baseband signal;
a baseband signal density determining unit which determines a density of the baseband signal, based on the difference between the baseband signal and the delay signal analyzed by the baseband signal analyzing unit, and
a VSWR output switching unit which restrains output of the VSWR measuring unit from being displayed, when the baseband signal density determining unit determines that the density of the baseband signal is lower than a determination threshold value, wherein
the VSWR output switching unit outputs a measurement value of the VSWR measured by the VSWR measuring unit and displays the measurement value, when it is determined that the density of the baseband signal is higher than the determination threshold value.

5. A Voltage Standing Wave Ratio (VSWR), determination method, the method comprising:
measuring, by a wireless device, the VSWR;
determining reliability of a measurement value of the measured VSWR;
said determining reliability includes:
detecting a difference between a baseband signal, and a delay signal of the baseband signal, the delay signal of the baseband signal being a time-delayed version of the baseband signal;
determining a density of the baseband signal, based on the detected difference;
restraining output of a VSWR measurement result, when it is determined that the density of the baseband signal is lower than a determination threshold value,
and outputting a measurement value of the VSWR, when it is determined that the density of the baseband signal is higher than the determination threshold value.

* * * * *